(12) United States Patent
Stevens et al.

(10) Patent No.: US 6,963,334 B1
(45) Date of Patent: Nov. 8, 2005

(54) SMART COLLABORATIVE WHITEBOARD INTEGRATED WITH TELEPHONE OR IP NETWORK

(75) Inventors: Clarke Stevens, Littleton, CO (US); Anne P. McClard, Lafayette, CO (US)

(73) Assignee: MediaOne Group, Inc., Englewood, CO (US)

( * ) Notice: Subject to any disclaimer, the term of this patent is extended or adjusted under 35 U.S.C. 154(b) by 494 days.

(21) Appl. No.: 09/547,512

(22) Filed: Apr. 12, 2000

(51) Int. Cl.[7] .............................................. G09G 5/00
(52) U.S. Cl. ...................... 345/179; 345/173; 345/1.2; 178/18.1; 178/19.01; 709/205; 709/219; 715/733; 715/751
(58) Field of Search ............................... 345/173–179, 345/104, 905, 158, 156, 157, 1.1, 1.2; 178/18.01, 178/18.03–18.04, 18.05, 18.06, 18.07, 18.08, 178/18.09, 18.1, 19.01–19.05, 18.02; 715/733, 715/750–753; 709/204–205, 206, 217–219

(56) References Cited

U.S. PATENT DOCUMENTS

| | | | |
|---|---|---|---|
| 4,400,724 A | 8/1983 | Fields | |
| 5,025,314 A | 6/1991 | Tang et al. | |
| 5,508,713 A * | 4/1996 | Okouchi | 345/1 |
| 5,561,446 A * | 10/1996 | Montlick | 345/173 |
| 5,917,470 A * | 6/1999 | Fujioka | 345/753 |
| 6,181,326 B1 * | 1/2001 | Takahashi | 345/158 |
| 6,304,898 B1 * | 10/2001 | Shiigi | 709/206 |

FOREIGN PATENT DOCUMENTS

JP        2-287 615      * 11/1990      .............. G06F 3/14

* cited by examiner

Primary Examiner—Lun-yi Lao
(74) Attorney, Agent, or Firm—Brooks Kushman P.C.

(57) ABSTRACT

A system and method is discloses for remotely displaying and creating handwritten information in real time. A first writing/display surface is used in conjunction with a stylus to scribe graphical images as well as text onto the surface for sharing the scribed information with other users. Once the handwritten information is created by touching the stylus to the first writing/display surface it is immediately sent to a remote second writing/display surface. A user of the second writing/display surface receives and views the transmitted handwritten information and then can transmit information by touching the stylus to the writing/display surface. The present invention, allows users to view the same workspace and make modifications to the displayed texts and graphics in real time.

15 Claims, 3 Drawing Sheets

SMART COLLABORATIVE WHITEBOARD INTEGRATED WITH TELEPHONE OR IP NETWORK

TECHNICAL FIELD

The present invention relates to real time interactive communication devices for communicating handwritten text and graphical information between remote users.

BACKGROUND ART

It is desirous and occasionally required that two or more collaborators work together on a creation while being physically separated from one another. Such a situation is generally referred to as "remote collaboration". Collaboration, in general, involves creating and displaying text and graphics and then sharing the information created with each collaborator in real or substantially real time. This sharing may be facilitated by a system which provides a common shared work space. Working without a shared work space can limit collaboration by delaying the common understanding about a thing, task, etc. being referred to, limiting the ability of one collaborated to visually add to or comment on the work of another collaborator, causing significant delays in the chain of communication between the collaborators, etc.

There exists in the art a number of devices or systems allowing or facilitating various degrees of use of a shared work space. Some for example, allow remote users only to use the work space. For example, U.S. Pat. No. 4,400,724 issued to Fields teaches presenting images of both a user and a document or the like, and allowing some degree of interactive use of the document. Fields discloses a video teleconferencing system where a number of collaborators can interactively communicate via a plurality of interconnected monitors and cameras. A document is imaged by a video camera suspended above a target area where the document is located. Likewise, gestures related to the document made within the target area are imaged by the same video camera. The images are presented on the monitors of other collaborators. The other collaborators may modify the image by marking over their own target areas or referred to the image by gesturing in the appropriate locations in their own target area. The composite of the document's image modifications and gestures are distributed for viewing by collaborators on their monitors, which are physically separate from their target areas, in real time.

Other collaborative systems use computer monitors only. CU See Me and Microsoft Net Meeting are examples of these types of collaborative systems. Consequently, these systems make it more difficult for collaborators to quickly alter the collaborative subject matter.

It has been determined that a number of disadvantages exist in the present devices or systems of the type discussed above. First, in general in the art there are no devices having writing surfaces which coincide with the viewing surfaces for all users. This disparity between input location and output location can make it unnatural or difficult to collaboratively instruct in a user drawing. What is desired is a system in which the writing and viewing surfaces coincide to allow shared marking directly on the presented image. Secondly, those devices or systems that transmit full video signals required high bandwidth transmission between the user sites. This may be prohibitively expensive and render unsatisfactory images when transmitted according to developing standard communication protocol, such as NTSC analog video or digital video transmitted over ISDN or used with common data compression schemes, etc.

Accordingly, what is needed is a system having a more limited transmission bandwidth requirement than previously available.

DISCLOSURE OF INVENTION

Accordingly, an object of the present invention is to provide a system having a shared workspace for displaying and creating handwritten information over a communication network.

It is, therefore, an object of the present invention to provide a system for writing and displaying handwritten text and images created by the users who are physically separated from each other.

In accordance with these and other objects, the present invention provides a system and method for remotely displaying and creating handwritten information in real time. A first writing/display surface is used in conjunction with a stylus to scribe graphical images as well as text onto the surface for sharing the scribed information with other users. Once the handwritten information is created by touching the stylus to the first writing/display surface it is immediately sent to a remote second writing/display surface. A user of the second writing/display surface receives and views the transmitted handwritten information and then can transmit information by touching the stylus to the writing/display surface. The present invention, allows users to view the same workspace and make modifications to the displayed texts and graphics in real time.

Thus, in accordance with one aspect of the present invention, a system is provided for receiving, transmitting and displaying handwritten information on a writing/display device. The system includes a first writing/display surface, a second writing/display surface, a communication network and a stylus. The first and second writing/display surfaces are capably of receiving and transmitting handwritten information imparted to the surface. The communication network is connected to the first and second writing/display surfaces for relaying information imparted to the first and second writing/display surfaces. The stylus activates the writing/display surfaces for creating handwritten information to send to each writing/display surfaces.

wherein handwritten information is communicated between the first and second writing/display surfaces via a communication network when the stylus is in slidable contact with at least one of the first and second writing/display surfaces.

In accordance with another aspect of the invention, a method is provided for creating handwritten information using a stylus and a writing/display surface. The handwritten information is then transmitted to and received by a second remote writing and display surface, and then remotely displaying video signals on a hand-held transceiver device. The method includes receiving video signals from a video distribution network, processing received video signals for displaying on at least one hand-held transceiver device and relaying a received video signal to at least one hand-held transceiver device. The method according to the present invention allows the user to receive video and audio signals with a hand-held device which also has operating control of at least on electronic device such as a television or a stereo.

The above object and other objects, features, and advantages of the present invention are readily apparent from the following detailed description of the best mode for carrying out the invention when taken in connection with the accompanying drawings.

BEST MODE FOR CARRYING OUT THE INVENTION

A novel apparatus allowing remote interactive use of a plurality of writing surfaces will now be described. It will be appreciated, however, that the spirit and scope of the present invention encompass many other embodiments and applications. Thus, the following description is limited only for the purposes of clarity and conciseness and should not be read as limiting the scope of the present invention.

Figure 1:
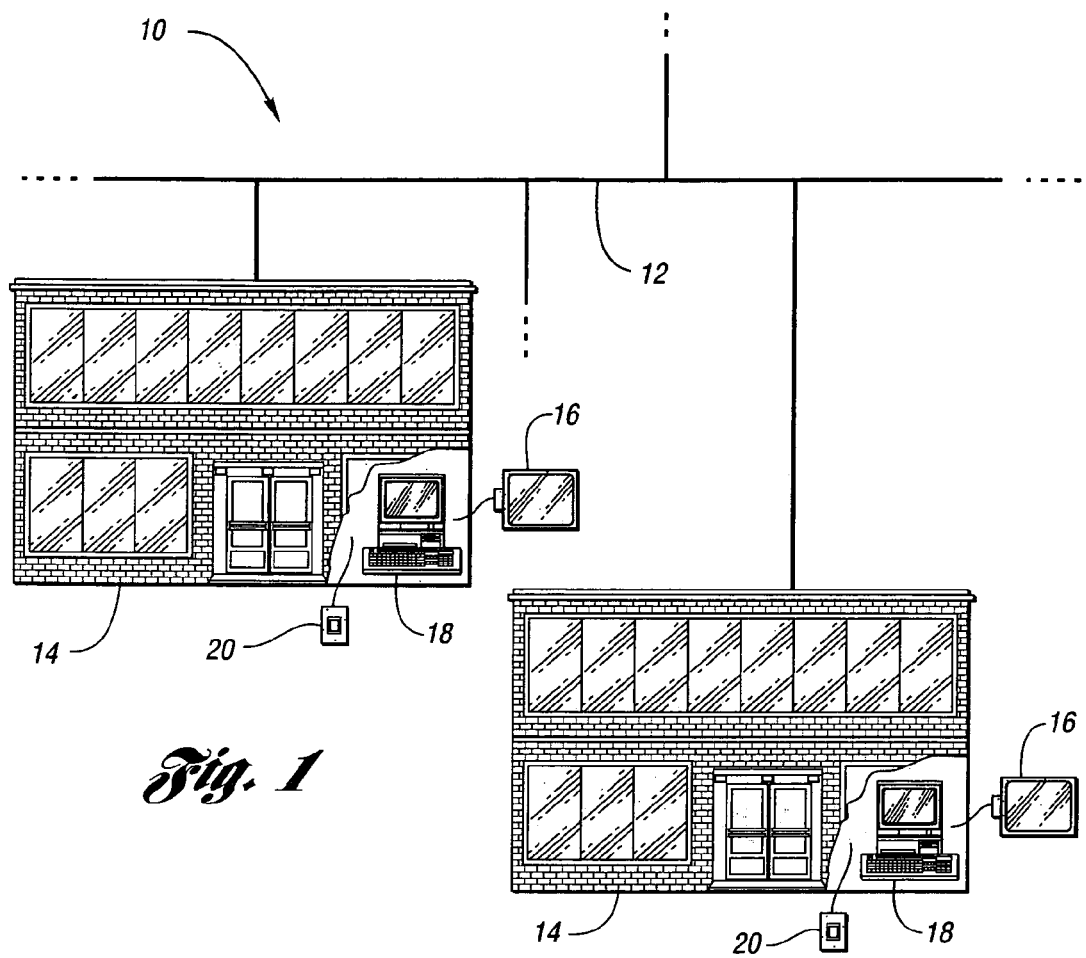
FIG. 1 is a block diagram illustrating a communications network connecting at least two user site for transmitting collaborative data, according to the present invention.

Referring now to FIG. 1, a system 10 for remote collaboration is illustrated according to the present invention. System 10 includes a communication network 12 for transmitting collaborative information between users of the system. The communication network 12 is connected to a plurality of user sites 14. Communication network 12 is preferably, but not necessarily, a telephone network or a cable television network consisting of twisted copper pairs or coaxial cables or a hybrid network consisting of fiber optic cable coupled to coaxial cable or twisted copper pairs. Of course, other communication mediums, including, but not limited to wireless networks, are contemplated by the present invention. Each of the user sites 14 contain a collaborative writing/display device 16 according to the present invention. The collaborative writing/display device 16 may be connected to a computer 18 or to a telephone jack 20 in communication with the communication network 12.

Figure 2:
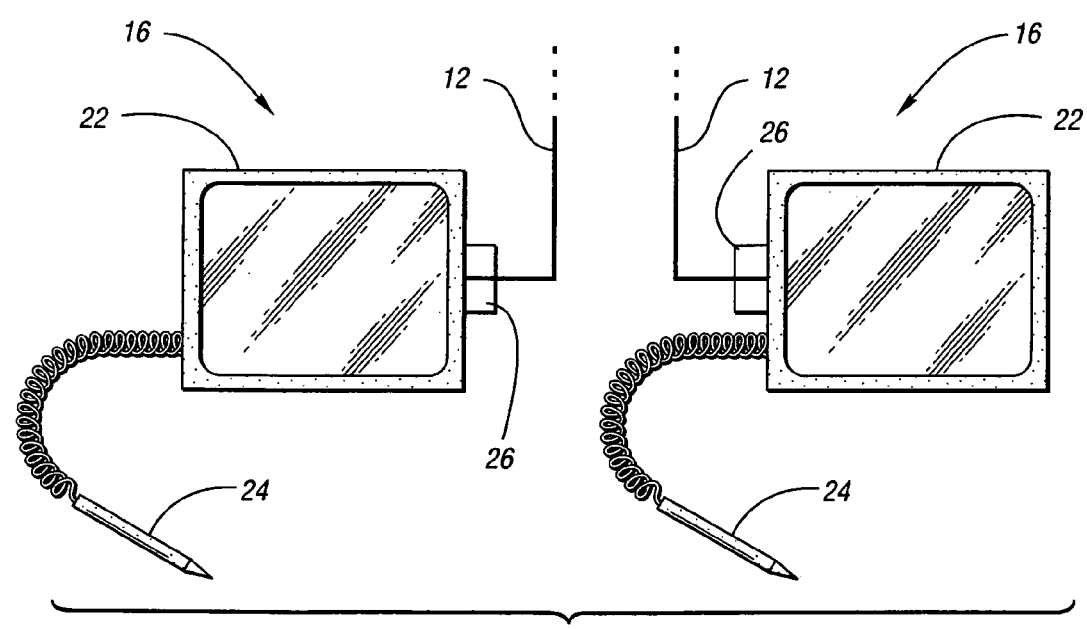
FIG. 2 is a perspective view of an apparatus for writing and displaying collaborative data wherein the apparatus is connected to a communications network, according to the present invention.

Referring now to FIG. 2, the collaborative writing/display device 16 for writing and displaying collaborative data is illustrated according to the present invention. In one embodiment of the present invention apparatus 16 includes a touch sensitive screen 22, a stylus 24 and a network interface unit 26. Touch sensitive screen 22 is responsive to contact by the stylus 24. The stylus is mechanically attached to screen 22 and does not require electrical communication with the screen. Collaborative data as referenced in the present application is data in the form of digital bits created by contacting the stylus 24 to the touch sensitive screen 22. For example, a figure or graphic may be created on the touch sensitive screen 22 by contacting the touch sensitive screen 22 with the stylus 24 and dragging the stylus across the screen to create different shapes. In a similar manner, handwritten text may be created. Whatever is written on the screen 22 will be transmitted via the network interface unit 26 to the communication network 12. Network interface unit 26 allows the writing/display device 16 to connect to and transmit collaborative data directly across the communications network without connecting to computer 18.

Figure 3:
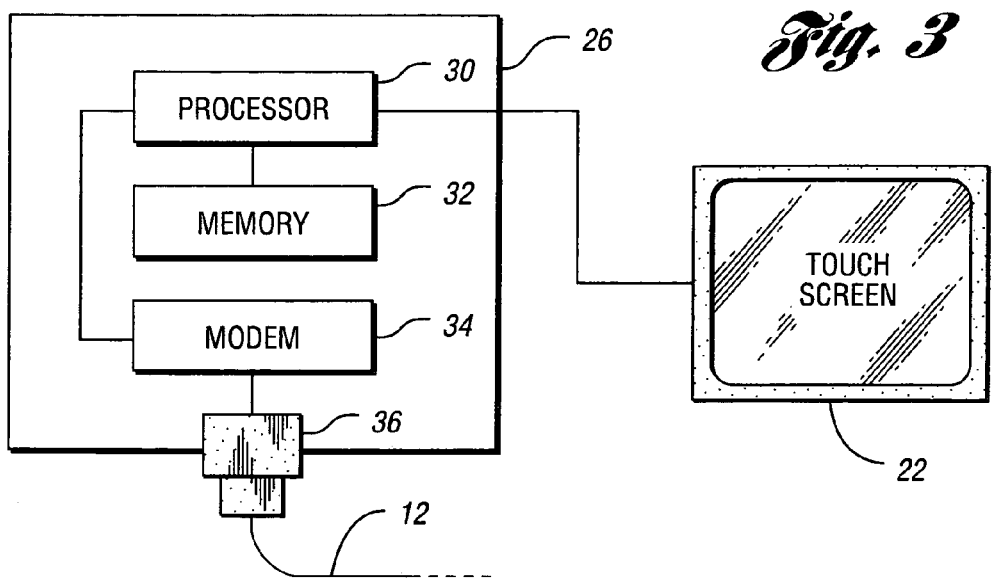
FIG. 3 is a block diagram illustrating a circuit for transmitting and receiving data scribed on a writing and displaying device for collaborative communication via a communications network, according to the present invention.

A more detailed perspective of the network interface unit 26 is illustrated in FIG. 3, according to the present invention. The network interface unit 26 includes a processor 30, memory 32 and a modem 34. Processor 30 is connected to the touch sensitive screen 22, memory 32 and the modem 34. Processor 30 controls the flow of collaborative data written and displayed on the touch sensitive screen 22. For example, collaborative data created by a user of the screen 22 is sent to memory 32 where it is temporarily stored until it can be transmitted by the modem 34. The processor 30 being connected to memory 32 directs the collaborative data from the screen 22 to the memory 32. Modem 34 is capable of receiving the collaborative data from the processor 30 and transmitting the data over the communication network via a network connector 36.

If the writing/display device 16 is connected to the computer 18 instead of directly to the telephone jack 20 the network interface unit 26 will be inactivated. The control of transmission and reception of collaborative data would be handled by the computer 18. In this case, computer 18 would have to be connected to a communication network such as a cable television network via an Ethernet LAN card or a telephone network via an internal or external modem. When transmitting data across a network of computers such as the Internet standard networking protocols would be used.

Figure 4:
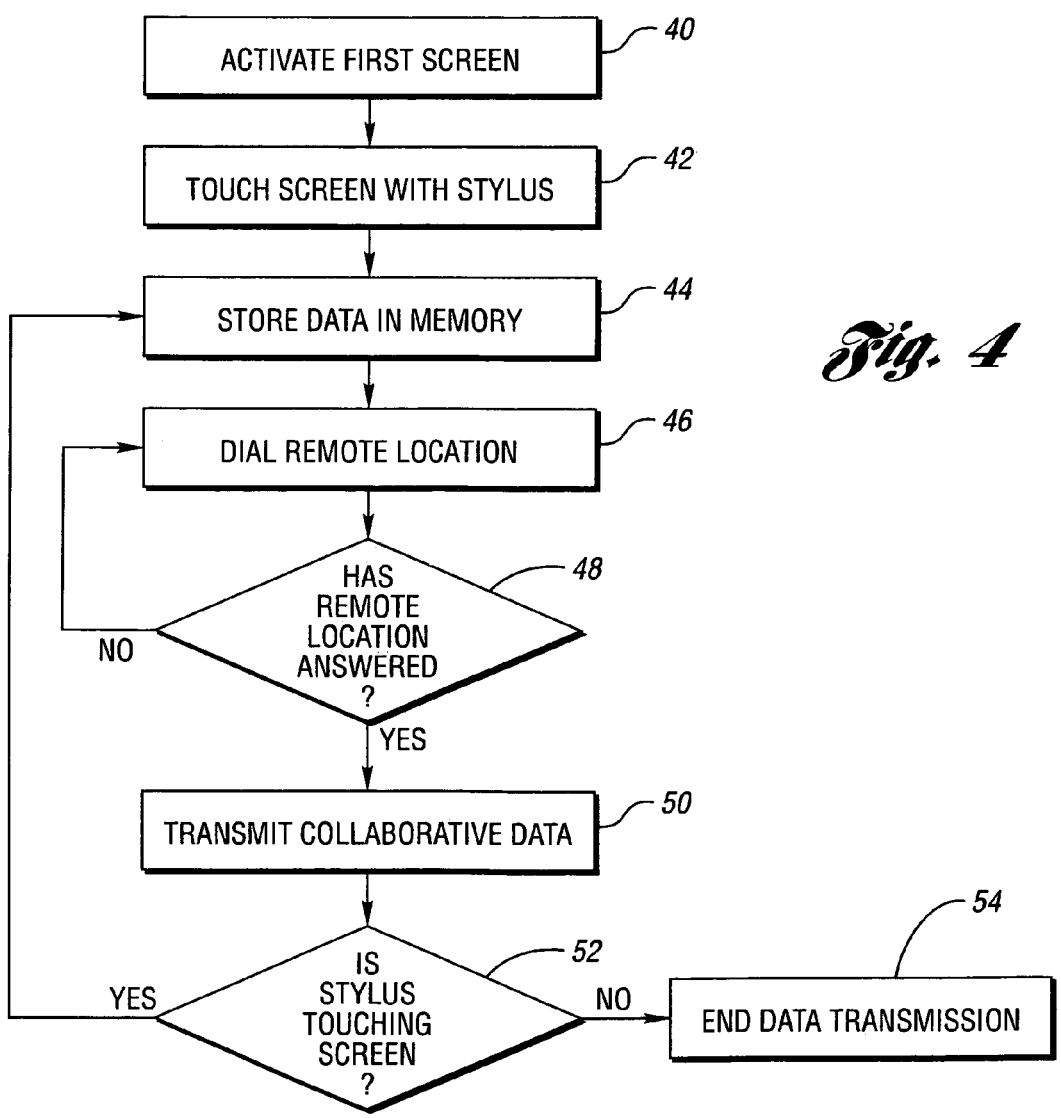
FIG. 4 is a flow diagram illustrating a method for transmitting written data for collaborative communication via a communications network, according to the present invention.

Reference is now made to FIG. 4 which illustrates a process for writing and transmitting collaborative data to a remote site in accordance with the present invention. In operation, collaborative data will be transmitted by one writing/display device 16 to another remote writing/display device 16 by first activating the writing/display device 16 as indicated by step 40. At step 42 a user of the writing/display device 16 contacts the touch screen 22 with the stylus 24 and creates a graphic or handwritten text. The graphic or handwritten text created by the user is stored in memory as represented by block 44. At block 46 the remote site where collaborative data is to be sent is dialed by the modem 34. As represented by block 48 if the remote location has not answered modem 34 will continue to dial the remote site, however if the remote site has answered the collaborative data will be transmitted to that site as represented by block 50. The present invention contemplates using a cable modem or digital subscriber line or similar network connection in place of the dial-up modem. At block 52 the system determines whether the stylus 24 is still in contact with the screen 22. If the stylus is still in contact with the screen 22 the collaborative data will continue to be stored as represented by block 44. On the other hand, if the stylus is not in contact with screen 22 data transmission will be terminated as represented by block 54.

Figure 5:
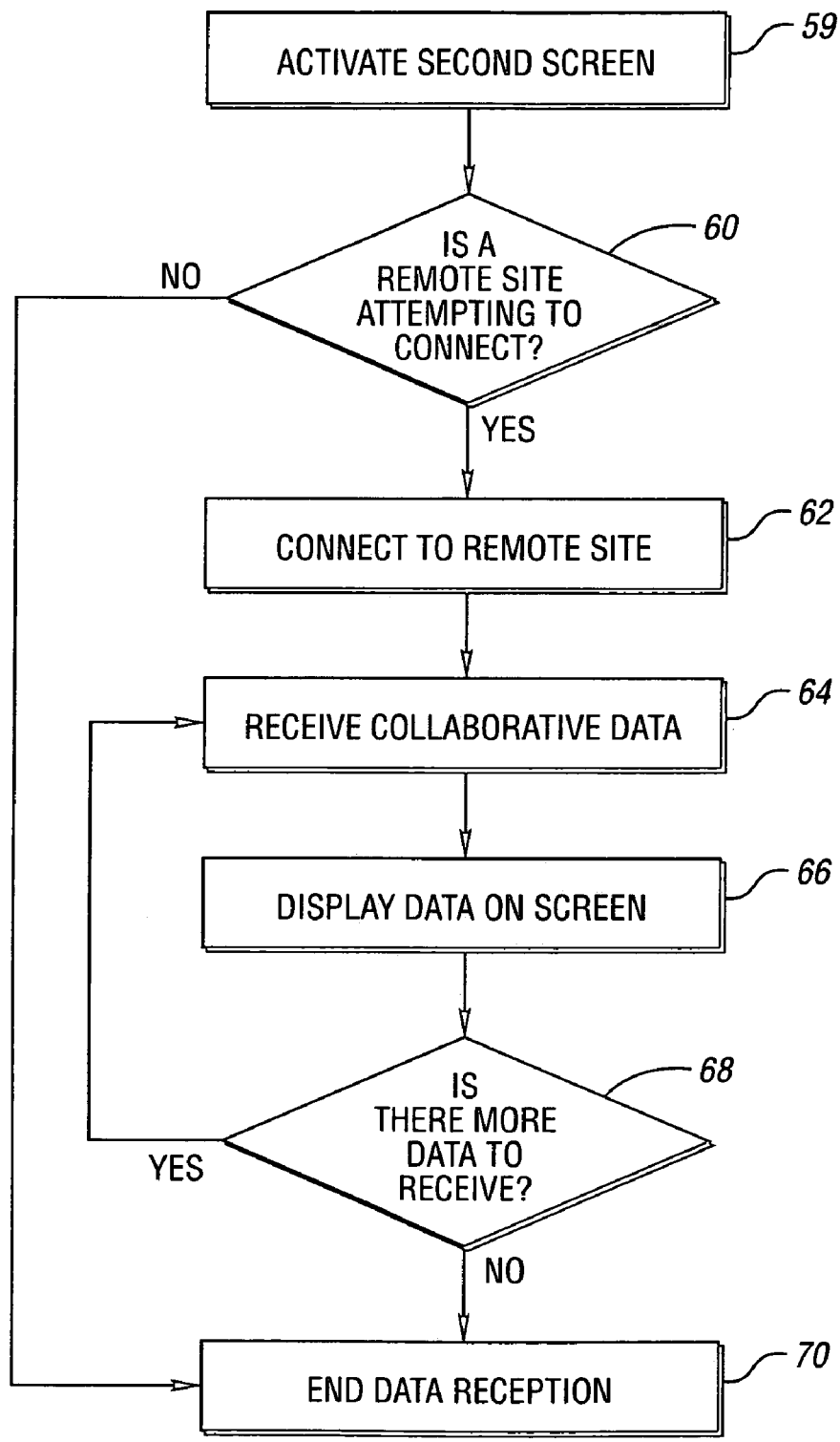
FIG. 5 is a flow diagram illustrating a method for receiving written data for collaborative communication via a communications network, according to the present invention.

A process for displaying received collaborative data on screen 22 will now be described with reference to FIG. 5. As in the process described above a second screen 22 must be activated to receive collaborative data as represented by block 59. At block 60 the writing/display device 16 determines whether a remote site is attempting to connect. If a remote site is not attempting to connect and transmit collaborative data, data reception is terminated as represented by block 70. However, if a remote location is attempting to connect then a connection is made to the remote site as represented by block 62. Once a connection is achieved collaborative data may start to be received by the modem 34 and then stored into memory 32 temporarily until it is displayed on the screen 22 as represented by block 64. At block 66 processor 30 sends the collaborative data stored in memory 32 to the screen 22 where it is displayed. The writing/display device 16 determines whether there is more collaborative data to receive as represented by block 68. If more collaborative data is to be received because the stylus 24 is still in contact with the screen 22 at the remote site then the collaborative data will continue to be received as represented by block 64. However, if the stylus 24 is not contacting the touch screen 22 at the remote site the data reception will be terminated as represented by block 70.

In operation the processes described above would be accomplished by each of a plurality of writing/display devices 16. For example, a graphic is created by a first user have a writing/display device 16 and the graphical information is transmitted to at least one other user, such as a second user, having a similar writing/display device 16 at a remote site. The collaborative date is displayed on the second user's writing/display device 16 and is available for the second user to modify or comment on etc. If the second user adds to the graphic the added data will be sent to the first user and displayed on the first user's writing/display device 16. In this manner a collaborative communication is conducted using a plurality of writing/display devices 16. If there are more than two users a computer server is used to facilitate the collaboration.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for substantially real time remote collaboration, the system comprising:
    a first writing/display surface for receiving handwritten data imparted by a first user;
    a second writing/display surface for receiving handwritten data imparted by a second user;
    a communication network connected to the first and second writing/display surfaces for relaying the handwritten data imparted to the first and second writing/display surfaces; and
    a stylus for imparting the handwritten data to each of the writing/display surfaces via slidable contact,
    wherein the handwritten data is communicated between the first and second writing/display surfaces via the communication network when the stylus is in contact with at least one of the first and second writing/display surfaces, and the handwritten data imparted by one of the first and second users includes modifications of the handwritten data imparted by the other of the first and second users, thereby creating collaborative data.

2. The system of claim 1 wherein the writing/display surface includes a touch sensitive screen.

3. The system of claim 1 wherein the communication network includes a computer network.

4. The system of claim 1 wherein the communication network includes a cable television network.

5. The system of claim 1 wherein the communication network includes a telephone network.

6. The system of claim 1 further comprising a network interface unit connected to each writing/display surface for receiving and transmitting the handwritten data from and to the communication network.

7. The system of claim 6 wherein the network interface unit comprises a modem for communicating over a telephone network.

8. The system of claim 6 wherein the network interface unit includes memory for storing the handwritten data.

9. The system of claim 1 wherein the communication network includes a wireless network.

10. A method for substantially real time remote collaboration, the method comprising:
    activating a first writing/display surface;
    contacting the first writing/display surface with a stylus;
    sliding the stylus across the first writing/display surface to create handwritten data;
    transmitting the handwritten data over a communication network for reception by a second writing/display surface when the stylus is in contact with the first writing/display surface;
    receiving the handwritten data transmitted from the first-writing/display surface;
    displaying the handwritten data received on the second writing/display surface; and
    modifying the received handwritten data on the second writing/display surface to create collaborative data.

11. The method of claim 10 wherein contacting the first writing/display surface includes contacting a touch sensitive screen.

12. The method of claim 10 wherein the receiving and transmitting steps include receiving and transmitting the handwritten data via a network interface unit connected to each writing/display surface.

13. The method of claim 10 further comprising storing the handwritten data in memory in a network interface unit.

14. The method of claim 10 further comprising terminating transmission of the handwritten data when the stylus is no longer in contact with the first writing/display surface.

15. The method of claim 10 further comprising activating the second writing/display surface and determining if the first writing display/surface is attempting to connect to the second writing/display surface.

* * * * *